United States Patent [19]

O'Donnell et al.

[11] Patent Number: 5,124,530
[45] Date of Patent: Jun. 23, 1992

[54] STABLE LOW FUME STAINLESS STEEL WELDING ELECTRODE

[75] Inventors: David B. O'Donnell; Robert A. Bishel, both of Huntington, W. Va.

[73] Assignee: Inco Alloys International, Inc., Huntington, W. Va.

[21] Appl. No.: 650,506

[22] Filed: Feb. 5, 1991

Related U.S. Application Data

[63] Continuation of Ser. No. 496,797, Mar. 22, 1990, abandoned.

[51] Int. Cl.⁵ .............................................. B23K 35/22
[52] U.S. Cl. ................................................. 219/146.23
[58] Field of Search ...................... 219/146.22, 146.23, 219/146.3, 146.1, 146.24, 146.31, 145.23

[56] References Cited

U.S. PATENT DOCUMENTS

3,868,491  2/1975  Ito et al. ............................ 219/146.3

FOREIGN PATENT DOCUMENTS

2712512  10/1977  Fed. Rep. of Germany .
1073182   9/1954  France .
61-139695 6/1986  Japan .
63-59803  9/1989  Japan .
1389971   4/1988  U.S.S.R. ........................ 219/146.22
720834   12/1954  United Kingdom .
1353610   5/1974  United Kingdom .
1581182  12/1980  United Kingdom .

OTHER PUBLICATIONS

Chemical Abstracts—vol. 109:59390—p. 296.

*Primary Examiner*—Clifford C. Shaw
*Attorney, Agent, or Firm*—Blake T. Biederman; Francis J. Mulligan, Jr.

[57] ABSTRACT

The invention provides a coated electrode suitable for welding stainless steel. The coated electrode uses a stainless steel core wire. The flux contains by weight percent a total of 0 to 14.5 alkali metal and aluminum fluoride, about 0.5 to 12.5 cerium fluoride, a total of about 10 to 30 alkali metal and manganese carbonate, about 2 to 25 cerium oxide plus zirconium, about 0 to 25 chromium, about 0 to 10 manganese, about 5 to 15 total metal fluorides, and balance rutile. A binder holds the flux to the stainless steel core.

9 Claims, No Drawings

STABLE LOW FUME STAINLESS STEEL WELDING ELECTRODE

This application is a continuation-in-part of U.S. application Ser. No. 07/496,797, filed Mar. 22, 1990, abandoned.

TECHNICAL FIELD

This invention relates to welding electrodes, in particular, to weld rods having improved arc stability and low fuming of hexavalent chromium.

BACKGROUND ART

Presently, sodium and potassium compounds are often included in flux ingredients for controlling arc stability. Arc stability is critical for alternating current (AC) operability, low direct current (DC) operability and out-of-position welding. Sodium and potassium compounds have long been used to stabilize welding arcs to increase welding operability. A problem with welding fluxes containing sodium and potassium allegedly is that they promote the formation of hexavalent chromium fumes during welding in the presence of chromium or chromium compounds. Hexavalent chromium fumes are not desirable and are preferably maintained at as low of a level as possible.

Others have attempted to solve this problem by eliminating sodium and potassium compounds from welding flux and binder ingredients. The technique has successfully limited the amount of hexavalent chromium formation, but at a great sacrifice to welding operability. These sodium- and potassium-free weld rods have less than desirable arc stability resulting in poor out-of-position welding, poor AC operability and poor low DC current operability. Bentonite, talc and silicates of sodium, potassium, and lithium advantageously are used to make electrodes that can be baked without cracking the coating. Once baked, electrodes must have an adequate coating for toughness to survive shipping. Electrodes free of potassium and sodium silicates typically have very poor toughness.

Hydroxyethylcellulose and other similar organic can be relied on to give a tough coating largely free of sodium and potassium provided that they are not baked out above 204-246° C. Exposure to temperatures above this will break down these organic compounds leaving the coating without strength. Baking at 232-260° C. for toughness will typically results in a coating with greater than 0.6% moisture and porosity in welds.

In addition to weld stability, the flux must also be capable of producing a slag having several properties. The slag must quickly solidify to provide support for the weld and to hold the slag in place when welding on sloped surfaces and especially on overhead surfaces. In addition, the slag must be easily cleaned or removed from the surface. Fluoride compounds are added to the weld flux to add proper fluidity to the slag and clean welding area. A common fluxing agent is cryolite ($Na_3AlF_6$) which adds fluidity to the weld, but cryolite also introduces sodium which promotes the formation of hexavalent chromium fumes. Thus, it is desirable to eliminate cryolite or limit use of cryolite to as low of levels as possible.

Sulfur and phosphorus, commonly known as tramp elements, are detrimental to weld deposit properties. These tramp elements often are introduced into a weld from impurities in flux ingredients. Magnesium and manganese are often used to limit harmful effects of sulfur in the weld. Phosphorus is typically controlled by stringent limitation of phosphorus in the welding electrode. Control of these tramp elements is essential for producing welds having acceptable properties.

It is an object of the invention to produce a stainless steel welding electrode with low hexavalent chromium fuming and good arc stability for improved welding characteristics.

It is a further object of the invention to produce a weld that solidifies quickly and is easily cleaned.

It is a further object of the invention to limit the amount of tramp elements in the weld.

SUMMARY OF THE INVENTION

The invention provides a coated electrode suitable for welding stainless steel. The coated electrode uses a stainless steel core wire. The flux contains by weight percent a total of 0 to 14.5 alkaline earth metal and aluminum fluoride, about 0.5 to 12.5 cerium fluoride, a total of about 10 to 30 alkali metal and manganese carbonate, about 2 to 25 cerium oxide plus zirconium, about 5 to 15 total metal fluorides, and balance rutile. A binder holds the flux to the stainless steel core.

DESCRIPTION OF PREFERRED EMBODIMENT

The invention provides stainless steel welding with improved welding characteristics. It has been discovered that cerium compounds provide arc stability for increased weldability for out-of-position welding, AC current and low DC current. The cerium content has also been found to contribute to slag removal and slag cleaning. In addition, when welding stainless steel, cerium does not appear to promote the formation of hexavalent chromium and it combines with sulfur to prevent pickup of sulfur in the weld metal. Cerium compounds themselves are mostly limited to the slag and readily detectable amounts of cerium do not enter the weld metal. Advantageously, amounts of cerium oxide and cerium fluoride are balanced to control slag properties. This is important because excess cerium in the weld metal contributes to loss of malleability and solidification cracking.

Broad, intermediate and most preferred ranges of the invention are below in Table 1.

TABLE 1

| | Broad | Intermediate | Most Preferred |
|---|---|---|---|
| Alkaline Metal & Al Fluoride | 0–14.5 | 0–10 | 0–8 |
| $CeF_2$ | 0.5–12.5 | 1–10 | 2–8 |
| Alkaline Metal & Mn Carbonate | 10–30 | 15–25 | 18–22 |
| $CeO_2$ & $ZrO_2$ | 2–25 | 2–22 | 4–20 |
| $CeO_2$ | | 0–15 | 4–10 |
| $ZrO_2$ | | 0–20 | 0–15 |
| Rutile | Balance | 20–60 | 25–50 |
| Bentonite | 0–10 | 2–10 | 2–7.5 |
| Talc | 0–10 | 0–8 | 0–4 |
| HEC | 0–4 | 0.25–3 | 0.25–3 |
| Total Metal Fluorides | 5–15 | 6–12.5 | 6–10 |

Alkaline metal fluorides (barium, calcium and strontium) and aluminum fluoride may be used to provide and adjust slag fluidity and clean the welding area. It is recognized that an aluminum, barium, calcium, or strontium fluoride or any combination of may be used. Cerium fluoride also contributes to slag fluidity and to weld area cleaning. Excess total fluorides produce a slag that is overly fluid and insufficient slag causes the slag to have insufficient fluidity. Alkali metal or manganese carbonate or a combination of alkali metal and manganese may be added to ensure optimum operability and slag behavior. It is recognized that a carbonate formed with barium, calcium, manganese or strontium or any combination thereof may be used. Excess carbonate causes the slag to become powdery and difficult to remove. Insufficient carbonate results in loss of protective arc gases and an unstable arc. Cerium oxide and zirconia serve to decrease fluidity arising from compounds containing fluorine. Zirconia serves as a partial substitute to cerium oxide. Zirconia serves to only replace the fluidity control properties of cerium oxide. Rutile serves as a filler ingredient.

Balancing ingredients of chromium, manganese, molybdenum, copper, carbon, nickel, nitrogen and titanium are optionally added to the flux to control composition of the weld deposit. Amount of elements in the weld deposit are primarily controlled by the amount of elements in the core wire. Balancing ingredients may be added in varied amounts to the flux to closely match multiple stainless steels. Advantageously, core wire of the coated electrode matches the composition of the material to be welded and balancing ingredients, such as up to 25% chromium and up to 15% manganese, are added to the flux to compensate for material lost during welding. It is recognized that metallic balancing ingredients such as chromium and manganese may be added as metal powders or metal compound powders.

With cerium oxide and cerium fluoride ingredients of the invention, sodium and potassium containing compounds may be replaced in whole or in part. In particular, cerium oxide may completely or partially replace potassium and sodium compounds such as nepheline syenite to provide arc stability. In addition, fluorides such as cryolite may be partially or completely replaced by cerium fluoride, since cerium fluoride adds fluidity to the slag and cleans the welding area. Furthermore, cerium oxide and cerium fluoride limit sulfur pickup in the weld and provide excellent arc stability for AC and DC welding. A binder, preferably a silicate binder, is used to hold the flux to the core wire. Hydroxyethylcelullose (HEC) is advantageously added as an extrusion aid and to provide green strength after extrusion of flux onto a core wire. In addition, bentonite is advantageously added to provide strength after baking.

In particular, the flux of Table 2 was prepared for use with 308, 309 and 310 type stainless steel electrodes.

TABLE 2

DRY FLUX

| Powder Ingredient | Nominal Wt. % |
|---|---|
| Cerium Fluoride (CeF$_2$) | 4 |
| Calcium Fluoride (CaF$_2$) | 10 |
| Calcium Carbonate | 20 |
| Cerium Oxide (CeO$_2$) | 6 |
| Rutile (TiO$_2$) | 40 |
| Chromium | 9 |
| Electrolytic Manganese | 5 |
| Bentonite | 5 |
| HEC | 2 |

BINDER

| Ingredient | Wt. % (Relative to Flux) |
|---|---|
| Potassium Silicate | 5.0 |
| Lithium Sodium Polysilicate Solution | 0.5 |
| Sodium Silicate | 15.0 |
| Potassium Hydroxide | 0.75 |

TABLE 2-continued

| Water | 1.5 |
|---|---|

The calcium carbonate used was a coarse powder having a size between 74 and 420 microns were used. Those skilled in the art recognize that carbonate size is adjusted accordingly to facilitate drying of flux without cracking. The potassium silicate was a liquid having manufacturer's specification of 11.0%–13.2% K$_2$O, 25.75–26.75% SiO$_2$, 2.05–2.15% SiO$_2$ +K$_2$O, specific gravity at 20° C. of 1.37–1.40 g/cm$^3$ and a viscosity at 20° C. of 695–1395 centipoise. The lithium sodium polysilicate solution was a liquid having manufacturer's specification of 1.7–1.9% Li$_2$O, 1.1–1.3% Na$_2$O, 17.8–22.2% SiO$_2$, pH of 10.6–10.8 and specific gravity at 25° C. of 1.19 g/cm$^3$. The sodium silicate also was a liquid which had manufacturer's specification of 31.3–32.5% SiO$_2$, 10.5–11.5% Na$_2$O and 2.83–2.98% SiO$_2$ +Na$_2$), viscosity at 20° C. of 780–1140 centipoise and specific gravity at 20° C. of about 1.59–1.67 g/cm$^3$ Natrosol ® brand hydroxyethylcellulose (HEL) is a commercial off-the-shelf product which facilitates extrusion of fluxes onto core wires and improves green strength. The binder and flux were then combined and hydraulically pressed onto 0.32 cm diameter core wires at 28 MPa and then baked at 370–450° C. Core wires of 308, 309 and 310 stainless steels were tested. The binder and flux comprised about 30% of the weight of the electrodes after baking.

Welding electrodes tested had good operability with low fuming. Although sodium and potassium were not completely replaced, they were significantly reduced compared to fluxes commonly used. This reduction greatly reduces the amount of hexavalent chromium, potassium and sodium fumes. Furthermore, the arc was stable for improved out-of-position welding, AC welding and low current DC welding. Additionally, cerium combined with sulfur to limit sulfur pickup in the weld. There was no cerium pickup detected in the weld. Advantageously, cerium pickup in the weld deposit is less than 0.05 weight percent. Slag solidified quickly and was easily removed. Furthermore, the weld bead was clean and shiny in appearance. Fluxes with cerium compounds produced less fumes than the more volatile sodium and potassium compounds. A 316 stainless welding electrode has been produced with a 308 core by adding nickel and molybdenum and reducing chromium in the flux of Table 1 to control weld metal composition.

Cerium oxide and cerium fluoride have been successfully added with other flux ingredients to form stainless steel welding electrodes. Substitution of cerium fluoride and cerium oxide for conventional sodium- and potassium-containing welding ingredients has provided improved welding results. Addition of cerium compounds to fluxes in replacement of potassium and sodium compounds has been found to increase arc stability, reduce fuming of hexavalent chromium, potassium and sodium and promote simplified slag removal.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A coated electrode suitable for welding stainless steel comprising a stainless steel core wire, a flux coating containing by weight percent, a total of about 0 to 14.5 alkaline earth metal and aluminum fluoride, about 0.5 to 12.5 cerium fluoride, a total of about 10 to 30 alkaline earth metal and manganese carbonate, about 2 to 25 cerium oxide plus zirconia, about 5 to 15 total metal fluorides, and balance rutile, and binder for holding said flux to said core wire.

2. The coated electrode of claim 1 wherein the electrode includes by weight percent about 0 to 10 bentonite, about 0 to 4 hydroxyethylcellulose, about 0 to 10 talc and said binder is a silicate binder.

3. The coated electrode of claim 1 wherein said alkaline earth fluoride includes calcium fluoride and said alkaline earth and manganese carbonate includes calcium carbonate.

4. A coated electrode suitable for welding stainless steel comprising a stainless steel core wire and a flux coating containing by weight percent, a total of about 0 to 10 alkali metal and aluminum fluoride, about 1 to 10 cerium fluoride, about 6 to 12.5 total metal fluorides, a total of about 15 to 25 alkaline earth metal and manganese carbonate, about 2 to 22 cerium oxide, about 0 to 15 zirconia, about 20 to 60 rutile, and a binder for holding said flux to said core wire.

5. The coated electrode of claim 4 wherein said flux includes about 0.25 to 3 hydroxyethylcellulose, about 2 to 10 bentonite, about 0 to 8 talc and said binder is a silicate binder.

6. The coated electrode of claim 4 wherein said alkaline earth metal fluoride is calcium fluoride and said alkaline earth metal and manganese carbonate is calcium carbonate.

7. The coated electrode of claim 4 wherein said flux includes a total of about 0 to 8 alkali metal and aluminum fluoride, about 2 to 8 cerium fluoride, a total of about 18 to 22 oxide, 0 to 15 zirconia, about 4 to 20 cerium oxide plus zirconia, about 25 to 50 rutile, and a binder for holding said flux to said core wire.

8. The coated electrode of claim 7 including about 2 to 7.5 bentonite, about 0.25 to 3 hydroxyethylcellulose, about 0 to 4 talc and wherein said binder is a silicate binder.

9. The coated electrode of claim 7 wherein the alkaline earth metal fluoride is calcium fluoride and said alkaline earth metal and manganese carbonate is calcium carbonate.

* * * * *